(12) United States Patent
Skorka et al.

(10) Patent No.: US 12,459,338 B2
(45) Date of Patent: Nov. 4, 2025

(54) VEHICLE DOOR AND METHOD OF MANUFACTURE

(71) Applicant: Consolidated Metco, Inc., Vancouver, WA (US)

(72) Inventors: Szymon Arkadiusz Skorka, Ridgefield, WA (US); Christopher Scott Davis, Boring, OR (US); Damian Lucaciu, Vancouver, WA (US); Terence H. Boulton, Portland, OR (US)

(73) Assignee: Consolidated Metco, Inc., Vancouver, WA (US)

( * ) Notice: Subject to any disclaimer, the term of this patent is extended or adjusted under 35 U.S.C. 154(b) by 0 days.

(21) Appl. No.: 18/219,260

(22) Filed: Jul. 7, 2023

(65) Prior Publication Data

US 2024/0010056 A1     Jan. 11, 2024

Related U.S. Application Data

(60) Provisional application No. 63/359,753, filed on Jul. 8, 2022.

(51) Int. Cl.
    *B60J 5/04*      (2006.01)
    *B60J 1/17*      (2006.01)
    *E05F 15/689*    (2015.01)

(52) U.S. Cl.
    CPC ............. *B60J 5/0481* (2013.01); *B60J 1/17* (2013.01); *B60J 5/042* (2013.01); *B60J 5/0455* (2013.01); *E05F 15/689* (2015.01)

(58) Field of Classification Search
    CPC ...... B60J 5/0416; B60J 5/0413; B60J 5/0481; B60J 5/0463; B60J 5/0455; B60J 5/042; B60J 1/17; E05F 11/385; E05F 15/689
    See application file for complete search history.

(56) References Cited

U.S. PATENT DOCUMENTS

| | | | | |
|---|---|---|---|---|
| 3,782,036 A | * | 1/1974 | Clark | B60J 5/0481 49/502 |
| 4,306,381 A | * | 12/1981 | Presto | B60J 5/0405 49/502 |
| 4,328,642 A | * | 5/1982 | Presto | B60J 5/0481 49/502 |

(Continued)

OTHER PUBLICATIONS

Invitation to Pay Additional Fees from International Patent No. PCT/US2023/027109 dated Sep. 6, 2023; 2 pages.

(Continued)

*Primary Examiner* — Justin B Rephann
(74) *Attorney, Agent, or Firm* — Fitch, Even, Tabin & Flannery LLP

(57) ABSTRACT

In one aspect, a vehicle door is provided that includes a plastic inner reinforcement for closing an opening of a vehicle. The plastic inner reinforcement fits the opening of the vehicle to provide reinforcement for the vehicle door about the periphery of the vehicle door. The vehicle door includes an outer shell, an inner cover panel, a support, a hinge portion configured to connect to a corresponding hinge portion of the opening of the vehicle, and a door latch for engaging a door strike of the opening of the vehicle. The support connects the hinge portion and the door latch to inhibit movement of the door latch relative to the hinge portion.

23 Claims, 17 Drawing Sheets

(56) References Cited

U.S. PATENT DOCUMENTS

| | | | | |
|---|---|---|---|---|
| 4,512,240 A * | 4/1985 | Mahler | B60J 5/0483 | 49/503 |
| 4,651,470 A * | 3/1987 | Imura | B60J 5/0411 | 49/502 |
| 4,769,951 A * | 9/1988 | Kaaden | B60J 5/0405 | 49/502 |
| 5,074,010 A | 12/1991 | Gignac | | |
| 5,536,060 A * | 7/1996 | Rashid | B60J 5/045 | 49/502 |
| 5,762,394 A * | 6/1998 | Salmonowicz | B60R 13/0243 | 49/502 |
| 5,857,732 A * | 1/1999 | Ritchie | B60J 5/0433 | 49/502 |
| 6,086,139 A * | 7/2000 | Heim | B60J 10/80 | 296/146.5 |
| 6,302,472 B1 * | 10/2001 | Rahmstorf | B60J 5/045 | 49/501 |
| 6,805,397 B1 * | 10/2004 | Chernoff | B60J 5/045 | 49/502 |
| 7,726,726 B2 * | 6/2010 | Cavallin | B60R 21/0428 | 296/146.7 |
| 8,033,592 B2 * | 10/2011 | Hsu | B60R 21/0428 | 49/502 |
| 9,010,839 B2 | 4/2015 | Schijve | | |
| 9,623,729 B2 * | 4/2017 | Glaumot | B60J 5/0456 | |
| 10,493,830 B2 * | 12/2019 | Hofer | B60J 5/107 | |
| 10,913,335 B2 | 2/2021 | Kuntze | | |
| 10,960,737 B2 * | 3/2021 | Jeon | B60J 5/048 | |
| 10,988,006 B2 * | 4/2021 | Jeon | B60J 5/0415 | |
| 11,065,944 B2 * | 7/2021 | Jeon | B60J 5/0406 | |
| 2007/0039245 A1 * | 2/2007 | Buchta | B60J 5/0455 | 49/502 |
| 2007/0062123 A1 * | 3/2007 | Kruger | B60J 5/0416 | 49/502 |
| 2007/0125003 A1 * | 6/2007 | Wartzack | B60J 10/86 | 49/502 |
| 2013/0097932 A1 * | 4/2013 | Kriese | E05F 11/06 | 49/376 |
| 2013/0181475 A1 * | 7/2013 | Torii | B60R 13/0243 | 296/146.7 |
| 2014/0110964 A1 * | 4/2014 | Schijve | B60J 5/0429 | 29/527.1 |
| 2014/0361576 A1 * | 12/2014 | Storgato | B60J 5/045 | 296/146.6 |
| 2017/0225547 A1 * | 8/2017 | Colosseo | B60J 5/0469 | |
| 2017/0240029 A1 * | 8/2017 | Moriyama | B60J 5/0431 | |
| 2018/0001749 A1 * | 1/2018 | Costigan | B60J 5/0415 | |
| 2018/0111456 A1 * | 4/2018 | Hofer | B60J 5/107 | |
| 2019/0176585 A1 * | 6/2019 | Jeon | B60J 5/0483 | |
| 2019/0176587 A1 * | 6/2019 | Jeon | B60J 5/0469 | |
| 2019/0176588 A1 * | 6/2019 | Jeon | B60J 5/0463 | |
| 2019/0176591 A1 * | 6/2019 | Jeon | B60J 5/0483 | |
| 2019/0184796 A1 * | 6/2019 | Jeon | B60J 5/0402 | |
| 2020/0062089 A1 * | 2/2020 | Hofer | B60J 5/0413 | |
| 2020/0238799 A1 * | 7/2020 | Jeon | B60J 5/0463 | |
| 2021/0347234 A1 | 11/2021 | Thienel | | |

OTHER PUBLICATIONS

Images and description of vehicle parts publicly available before Jul. 8, 2022, 2 pages.

International Search Report and Written Opinion from related International Application No. PCT/US2023/027109 dated Nov. 27, 2023; 15 pages.

* cited by examiner

US 12,459,338 B2

VEHICLE DOOR AND METHOD OF MANUFACTURE

CROSS-REFERENCE TO RELATED APPLICATION

This application claims benefit of U.S. Provisional Application No. 63/359,753, filed Jul. 8, 2022, which is hereby incorporated herein by reference in its entirety.

FIELD

This disclosure relates to vehicle doors and, in particular, to commercial vehicle doors and methods of manufacture.

BACKGROUND

Commercial vehicles typically have doors formed from stamped sheet metal. For example, a body of the door may be formed by stamping outer and inner door panels from sheet metal and crimping the outer door panel onto the inner door panel. Specifically, the outer door panel is positioned on the inner door panel, then a periphery of the outer door panel is bent around a peripheral edge of the inner door panel to join the outer and inner door panels. The door body is painted to provide better corrosion protection and to match the rest of the vehicle exterior The door body has openings and internal cavities that permit a worker on an assembly line to mount components, such as a latch mechanism, a door handle assembly, a window, and a window regulator in the body of the door. The sheet metal of the outer and inner panels of the door body provides a rigid structure to support the components of the door. However, the sheet metal is relatively heavy which increases the overall weight of the vehicle. Further, installing components of the door through openings and internal cavities of the body of the door is time and labor-intensive.

SUMMARY

In one aspect, a vehicle door is provided that includes a plastic inner reinforcement for closing an opening of a vehicle. The plastic inner reinforcement fits the opening of the vehicle to provide reinforcement for the vehicle door about the periphery of the vehicle door. The vehicle door further includes an outer shell, an inner cover panel, a support, a hinge portion configured to connect to a corresponding hinge portion of the opening of the vehicle, and a door latch for engaging a door strike of the opening of the vehicle. The support connects the hinge portion and the door latch to inhibit movement of the door latch relative to the hinge portion. In this manner, the support provides a rigid backbone for the vehicle door and connects the hardware for mounting the vehicle door to the vehicle. The support thereby strengthens the vehicle door to resist loading, such as a user pulling downward on a handle of the door to get into or out of the vehicle. Further, the support maintains a predetermined position of the door latch relative to the hinge portion to ensure alignment of the latch with the door strike as a user opens and closes the vehicle door.

In another aspect of the present disclosure, a method is provided for assembling a vehicle door. The vehicle door includes a plastic inner reinforcement for closing an opening of a vehicle, an outer shell, an inner cover panel, a support, a hinge portion, and a door latch. The method includes connecting the support, the hinge portion, and the door latch so that the support connects the hinge portion and the door latch to inhibit movement of the door latch relative to the hinge portion. The method further includes assembling the plastic inner reinforcement, the outer shell, the inner cover panel, and the support. The method thereby facilitates assembly of a vehicle door having a support that maintains the relative positions of the hinge portion and door latch while the support and a plastic inner reinforcement of the vehicle door resist deformation of the door such as during driving on the highway.

DETAILED DESCRIPTION

In one aspect of the present disclosure, a door is provided for a vehicle. The door has an outer shell, an inner reinforcement, and a support. The support is made of a material that is more rigid than the outer shell and the inner reinforcement. For example, the support may be made of a metallic material (e.g., steel or aluminum) and/or a composite material (e.g., carbon fiber) while the outer shell and inner reinforcement are made of one or more plastic materials. The support is connected to the outer shell and inner reinforcement to provide rigidity for the outer shell and inner reinforcement. Further, the support provides a structural backbone for components of the door such as a latch, one or more hinge portions, and a movable window.

For example, the door may include a hinge portion associated with support. The hinge portion is configured to be connected to a corresponding hinge portion of a body of the commercial vehicle. In one embodiment, the support includes a support body and the hinge portion includes a pair of hinge leaves that are mounted to the support body.

The door includes a door latch for securing the door in a closed position. The door also has a movable windowpane and a window regulator to move the window between closed and open positions. The support provides a rigid structure to support the door latch, the movable windowpane, and/or the window regulator.

In one embodiment, the inner reinforcement is sandwiched between the outer shell and the support. The door further includes an inner cover panel to cover the internal components of the door. The support is sandwiched between the inner reinforcement and the inner cover panel.

In another aspect of the present disclosure, a method is provided for assembling a vehicle door. The method includes assembling a first assembly comprising a door outer shell and a door inner support. The method further includes assembling a second assembly including connecting a support, a window regulator, and a latch. The method further includes connecting the first assembly and the second assembly. In one embodiment, the method further includes mounting a door panel to the support. In one embodiment, assembling the second assembly includes connecting a window and a window carrier to the support.

Figure 1A:
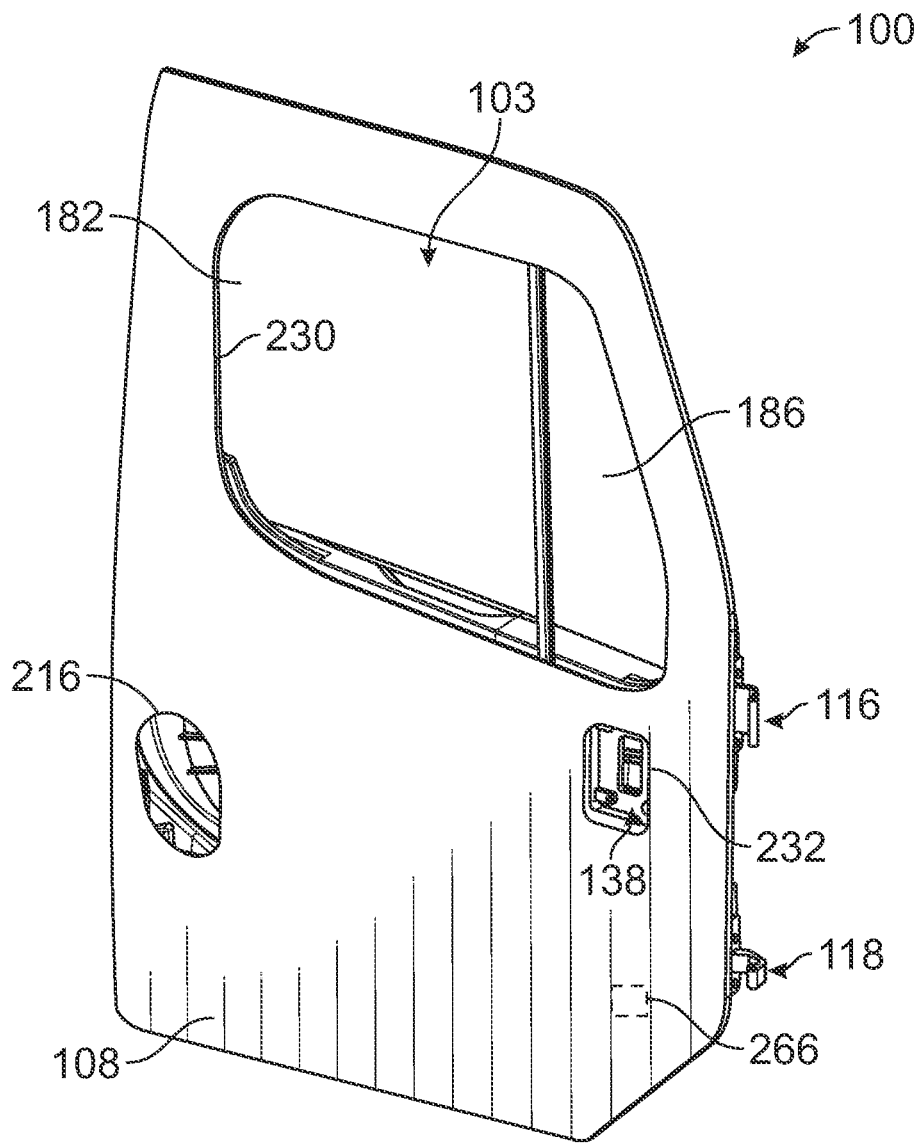
FIG. 1A is an exterior perspective view of a door according to the present disclosure.
Figure 1B:
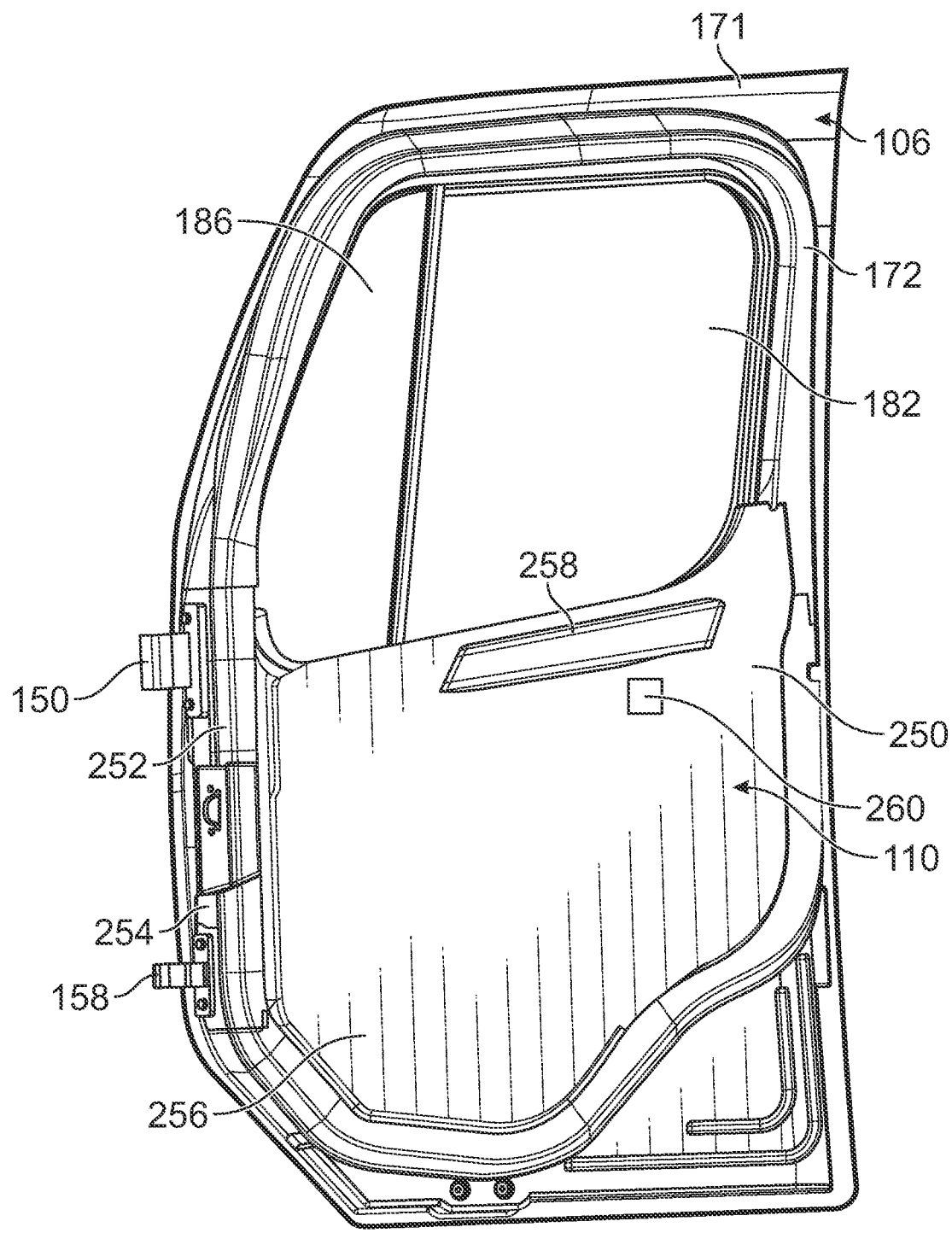
FIG. 1B is an interior perspective view of the door of FIG. 1A.
Figure 1C:
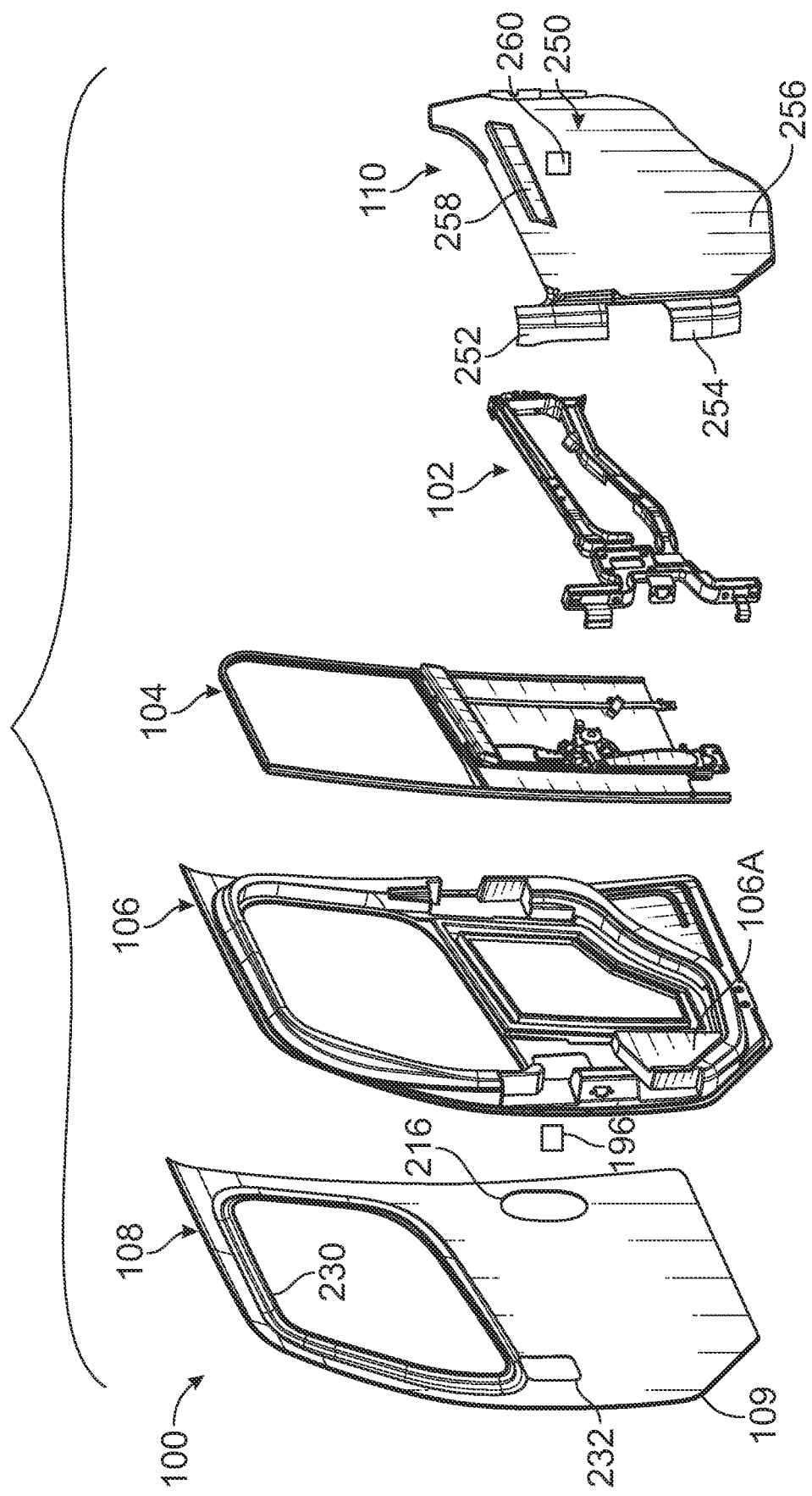
FIG. 1C is an exploded view of the door of FIG. 1A.
Figure 6:
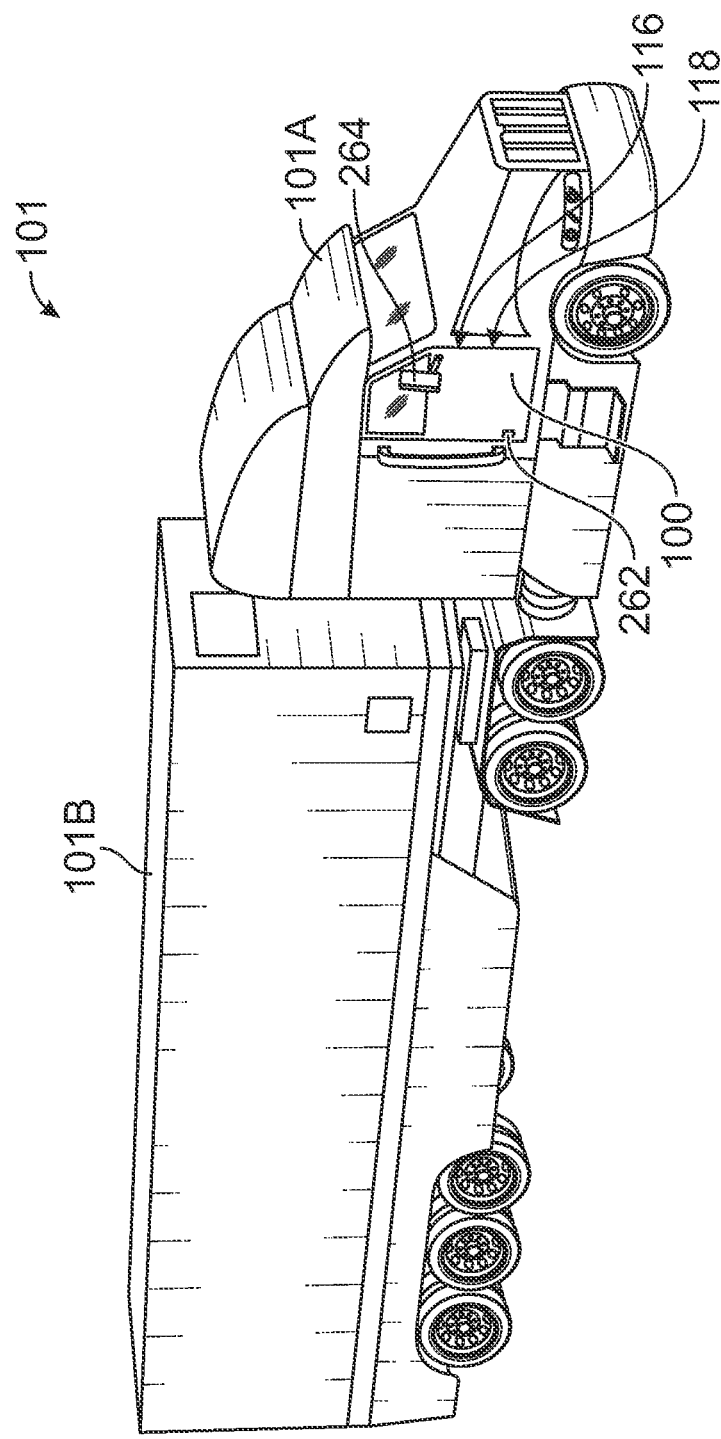
FIG. 6 is a perspective view of a commercial vehicle including the door 100 of FIG. 1.

Turning now to the figures, FIGS. 1A-1C show a door 100 according to an example embodiment of the disclosure. As shown in FIG. 6, the door 100 may be a door of a commercial vehicle, such as a semi-truck 101 having a tractor 101A and a trailer 101B. The door 100 may be used with other commercial vehicles including, as examples, cargo truck, dump truck, tipper truck, flatbed truck, and tanker truck. The door 100 may also be used with buses, recreational vehicles (RVs), and other vehicles that are not bound by the side impact requirements discussed below. The door 100 includes a window 103. With reference to FIG. 1C, the door 100 includes a support 102, a window system 104, an inner door support body such as inner reinforcement 106, an outer shell 108, and an inner cover panel 110.

Figure 2A:
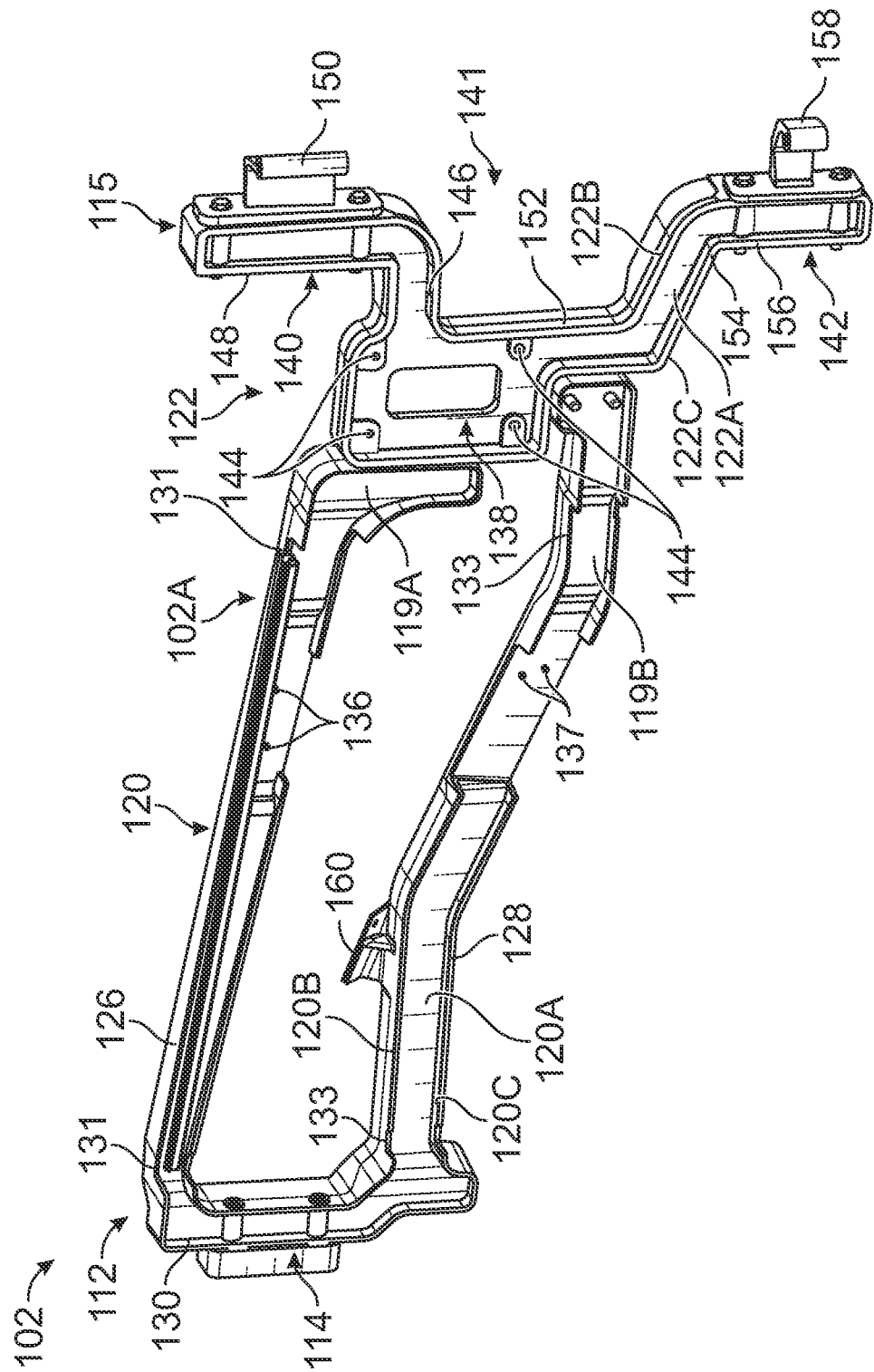
FIG. 2A is an exterior perspective view of a support of the door of FIG. 1A.
Figure 2B:
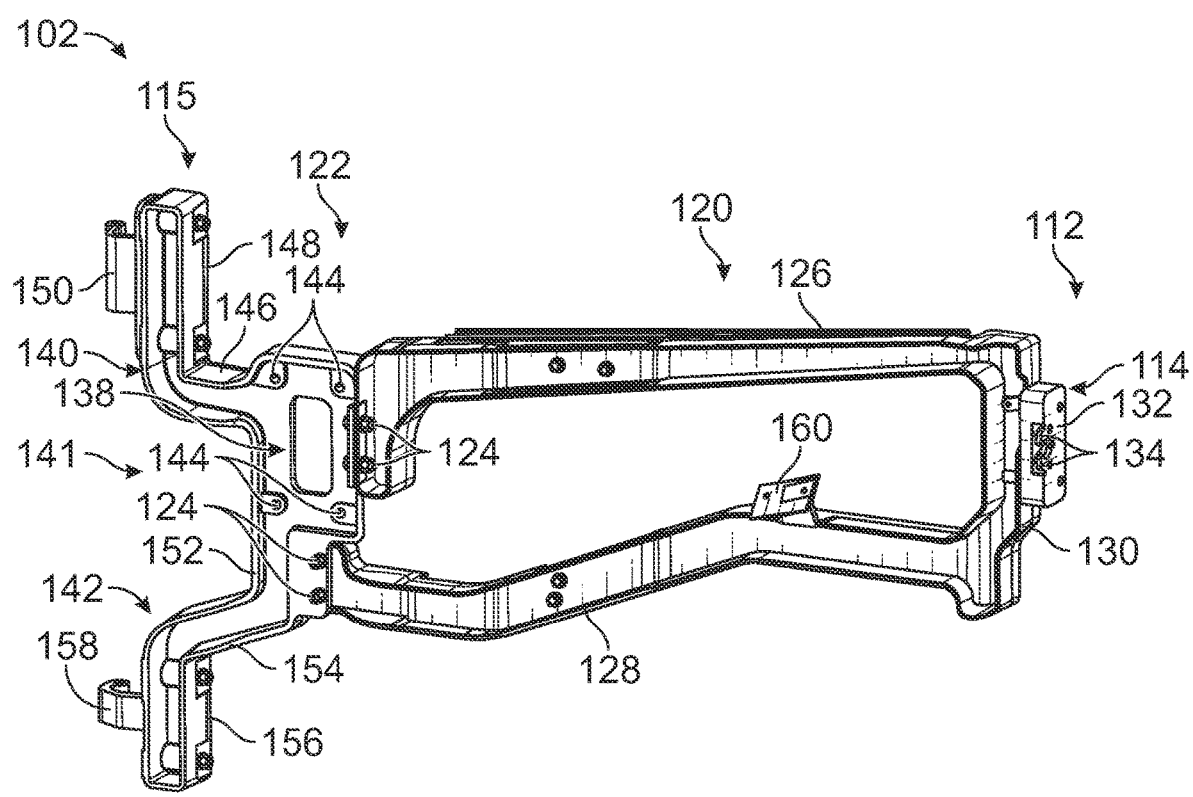
FIG. 2B is an interior perspective view of the support of FIG. 2A.
Figure 3A:
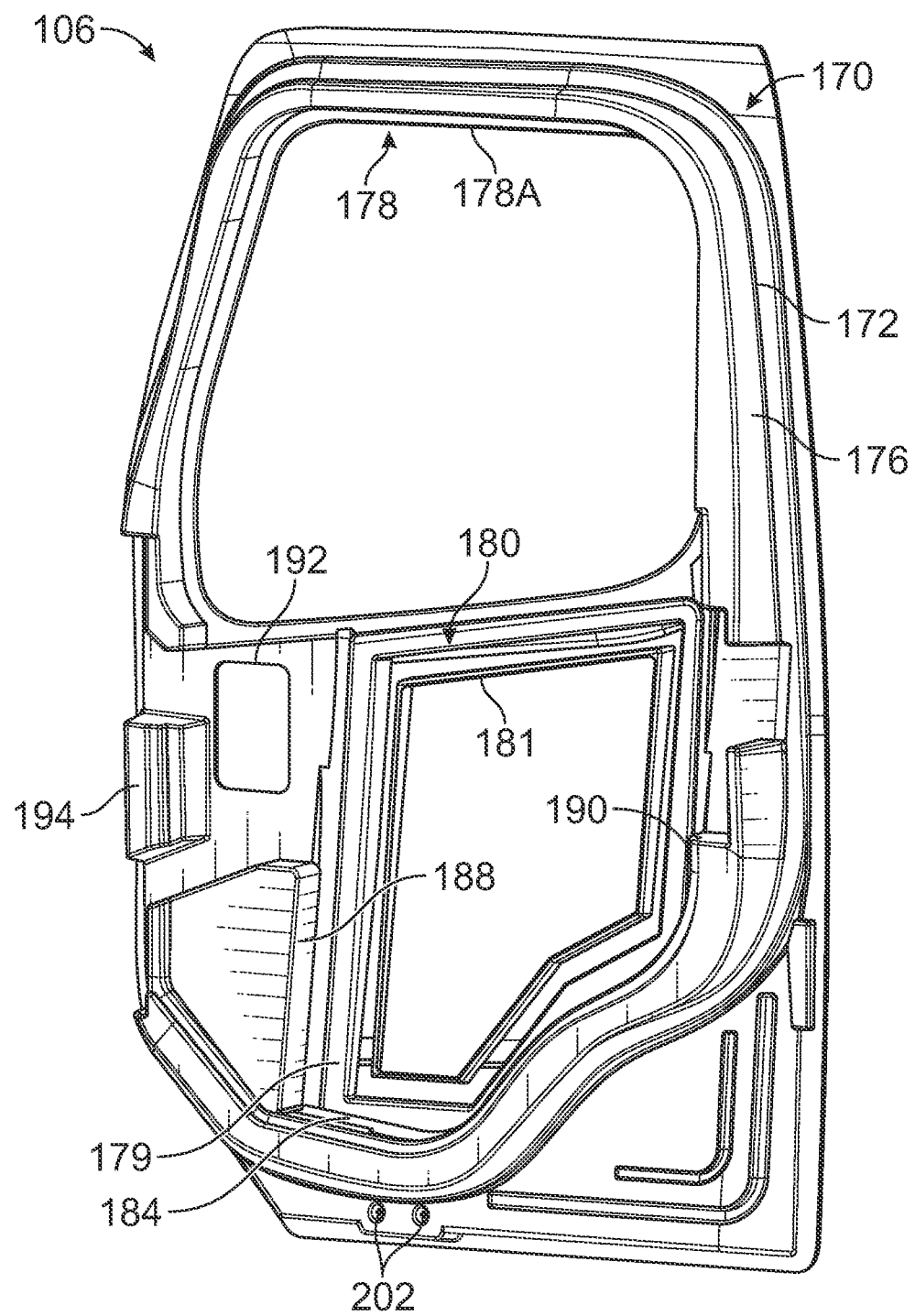
FIG. 3A is an interior perspective view of an inner reinforcement of the door of FIG. 1A.
Figure 3B:
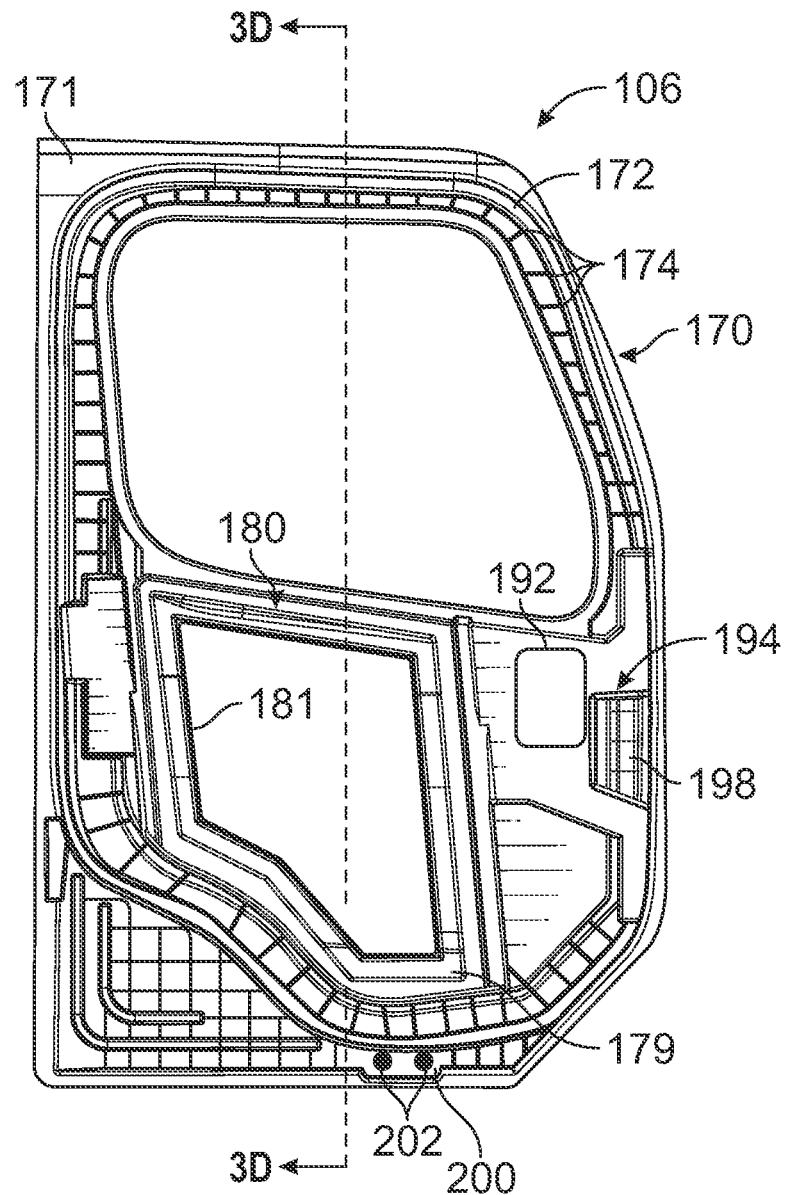
FIG. 3B is an elevational view of an exterior side of the reinforcement of FIG. 3A.
Figure 3C:
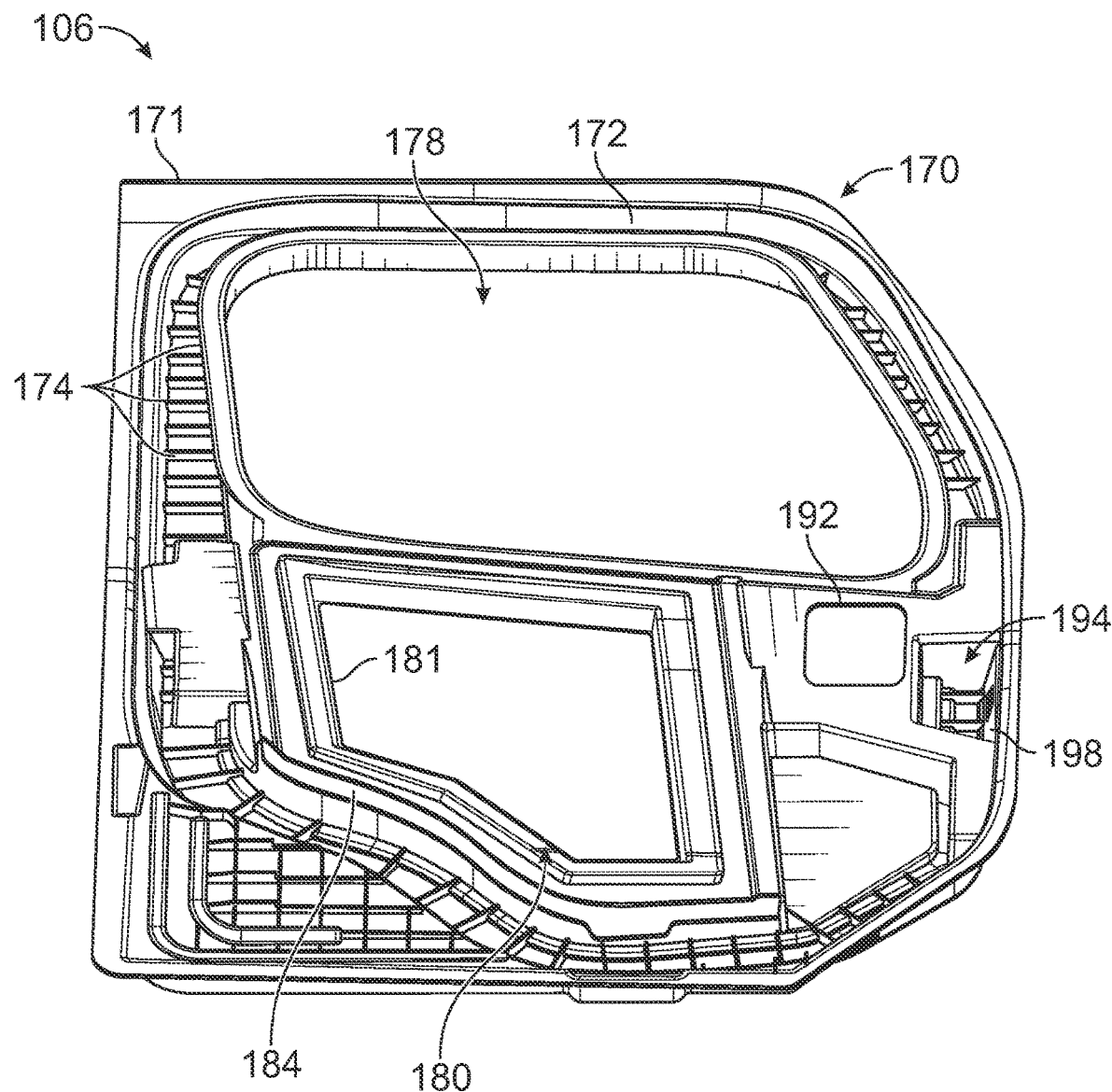
FIG. 3C is a bottom perspective view of the inner reinforcement of FIG. 3A.
Figure 3D:
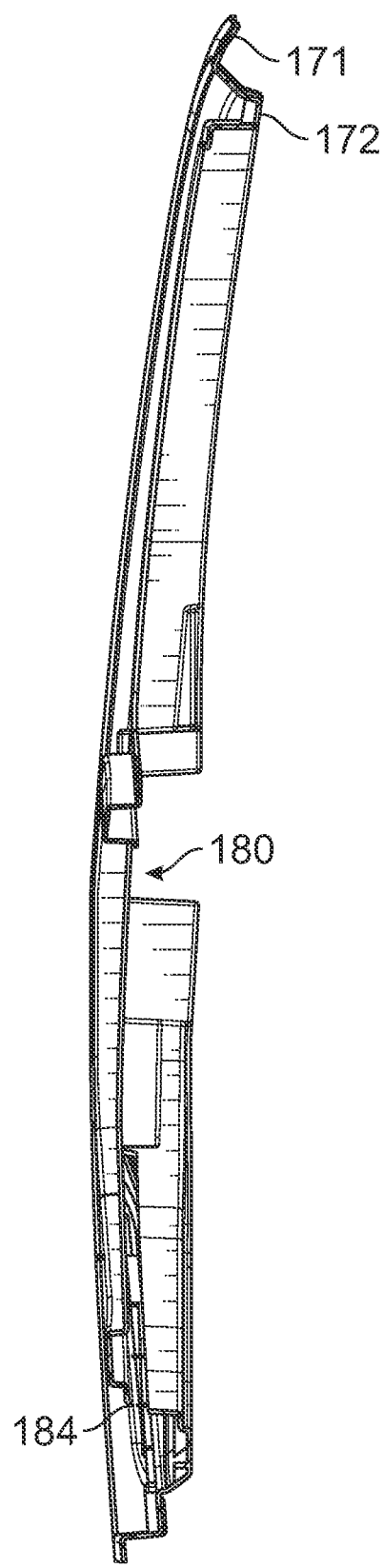
FIG. 3D is a cross-sectional view of the inner reinforcement of FIG. 3A taken along lines 3D-3D in FIG. 3B.
Figure 5:
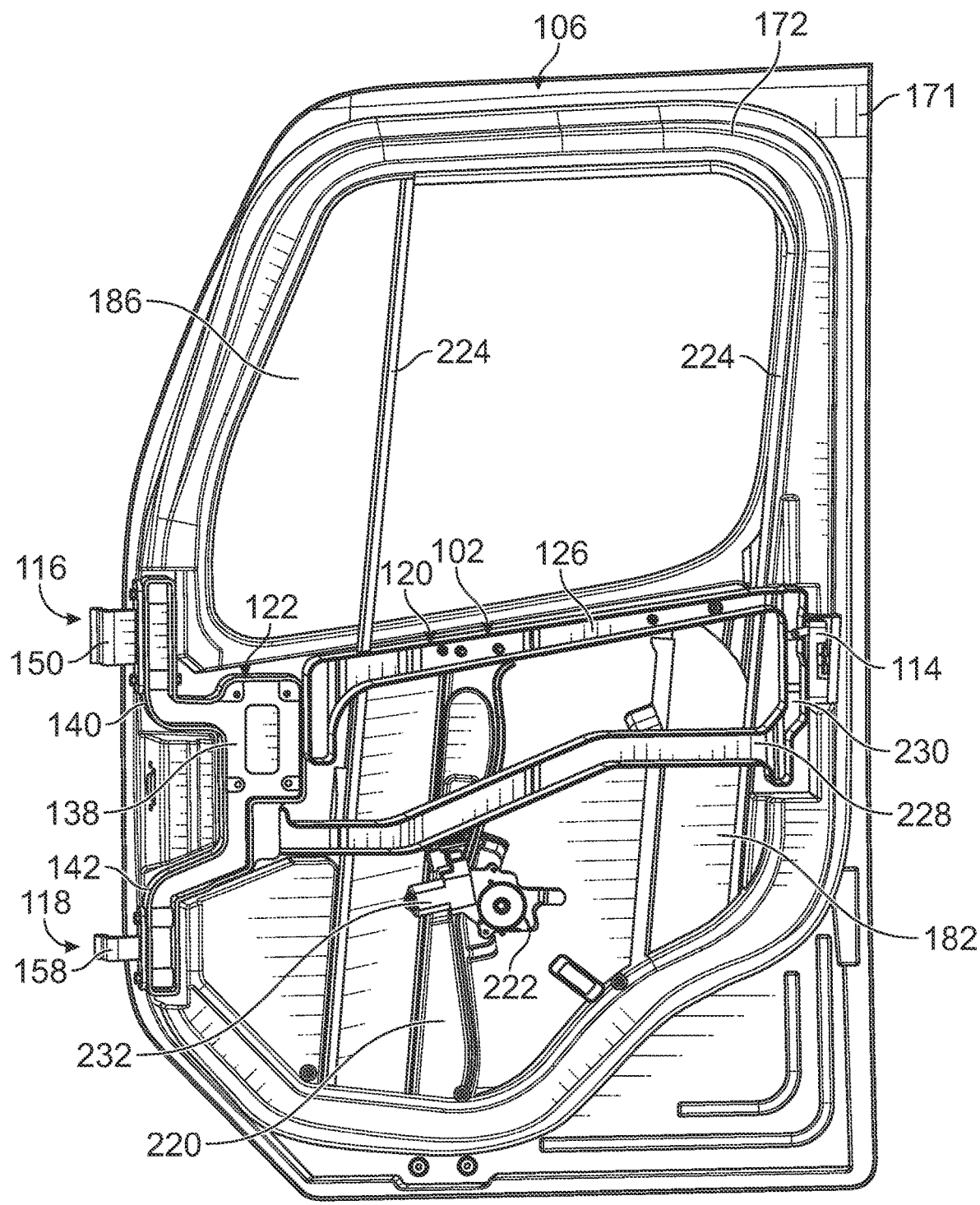
FIG. 5 is an interior perspective view of the door of FIG. 1A shown with an inner panel removed.

With respect to FIGS. 2A-2B and 5, the support 102 of the door 100 includes a rearward end portion 112 supporting a latch mechanism 114 and a forward end portion 115 connected to an upper hinge portion, such as leaf 150, of an upper hinge 116 (see FIG. 6) and a lower hinge portion, such as leaf 158, of a lower hinge 118.

The support 102 may be formed of one or more metallic materials, such as steel, aluminum, iron, stainless steel, iron alloys, zinc, and/or magnesium. The support 102 may include members that are cast, forged, rolled, extruded, additively manufactured, and/or formed of sheets of metal cut and/or bent and assembled, for example, by welding and/or with fasteners. Portions of the rigid support 102 may be machined to form mounting surfaces and mounting holes.

The support 102 may be made of one or more composite materials. The composite material may include a fiber reinforcement or a mat with plastic resin such as a polypropylene, nylon, and/or a polyurethane. Examples of manufacturing techniques that may be used to form the support 102 include injection molding, water assist injection molding, spray transfer molding, sheet molding compound, hybrid thermoforming/injection molding, and/or overmolding of thermoplastic reinforced laminates (e.g., organo sheets). The support 102 may be formed from different materials, such as a first metallic component and a second composite component.

When the door 100 is mounted to a vehicle, the support 102 extends across the opening of a cab body of the vehicle. When the door 100 is closed, the support 102 is securely mounted to the vehicle and extends across the opening of the cab body via the latching mechanism 114 and hinges 116, 118. The support 102 provide the door 100 with the strength and rigidity to withstand forces acting on the door 100 during operation of the vehicle, such as forces due to air traveling around the vehicle at high vehicle speeds. The support 102 may be configured to meet the side impact requirements for the commercial vehicle to which the door is mounted. Where the door 100 is mounted to a commercial vehicle, for example, the side impact force the door 100 is required to be able to sustain may be less than for non-commercial vehicles. This is due, in part, to the height of the door 100 relative to the ground. For instance, the door 100 of a commercial vehicle, such as that of the semi-truck 101, may be higher off of the ground compared to non-commercial vehicles such that the side impact requirements may be satisfied by the support 102. Thus, the support 102 of the door 100 may be configured to meet the side impact requirements of various standards bodies without additional structural reinforcement from other portions of the door 100.

With reference to FIG. 2A, the support 102 may include a body 102A having a first member 120 and a second member 122 secured together such as by welds and/or by fasteners 124. In another embodiment, the body 102A has a unitary, one-piece construction. The first member 120 has spaced apart ends 119A, 119B. The first member 120 has a generally I-shaped cross-section as the first member 120 extends between the ends 119A, 119B. Specifically, the first member 120 has a web 120A with flanges 120B, 120C at either end of the web 120A to provide increased strength and rigidity to the first member 120. The generally I-shaped cross-section resists bending and twisting of the first member 120. The first member 120 includes an upper crossbar portion 126 and a lower crossbar portion 128 extending generally forward from a rearward connecting portion 130 of the first member 120. The latch mechanism 114 is mounted to the connecting member 130 and is configured to maintain the door 100 in a closed position when the door 100 is closed by an operator.

With reference to FIG. 2B, the latch mechanism 114 includes a body 132 with one or more latches 134 pivotably mounted within the body 132 for securing the latch mechanism 114 to a striker of a doorjamb of the semi-truck 101. When the door 100 is moved from the open position to the closed position, the latch 134 engages the striker and pivots the latch 134 from a locked position to an unlocked position. The latch mechanism 114 has a biasing member to urge the latch 134 back to the locked position once the door 100 has closed to secure the door 100 in the closed position thereof. The latch mechanism 114 remains engaged with the door striker and keeps the door 100 closed until the latch mechanism 114 is released, for example, when an interior door handle 260 (see FIG. 1C) or exterior door handle 262 (see FIG. 6) is actuated. In one embodiment, the latch mechanism 114 may be mounted with an offset element, such as a shim and/or a mounting bracket.

Regarding FIGS. 2A and 2B, the upper crossbar portion 126 may include mounting holes 136 and the lower crossbar portion 128 may include mounting holes 137 to which the window system 104 may be secured to the first member 120. The lower crossbar portion 128 further includes a plate 160 to which the interior door handle 260 may be mounted. In another embodiment, the upper crossbar portion 126 has two sets of mounting holes and the lower crossbar portion 128 has two sets of mounting holes for securing the window system 104 thereto. The window system 104 may comprise, for example, two window regulators that work together to raise/lower the associated window.

The second member 122 may have a generally I-shaped cross-section including a web 122A with flanges 122B, 122C protruding from the periphery of the plate portion 122A to provide increased strength and rigidity for the second member 122. Specifically, the generally I-shaped cross-section resists bending and twisting of the second member 122.

Figure 8:
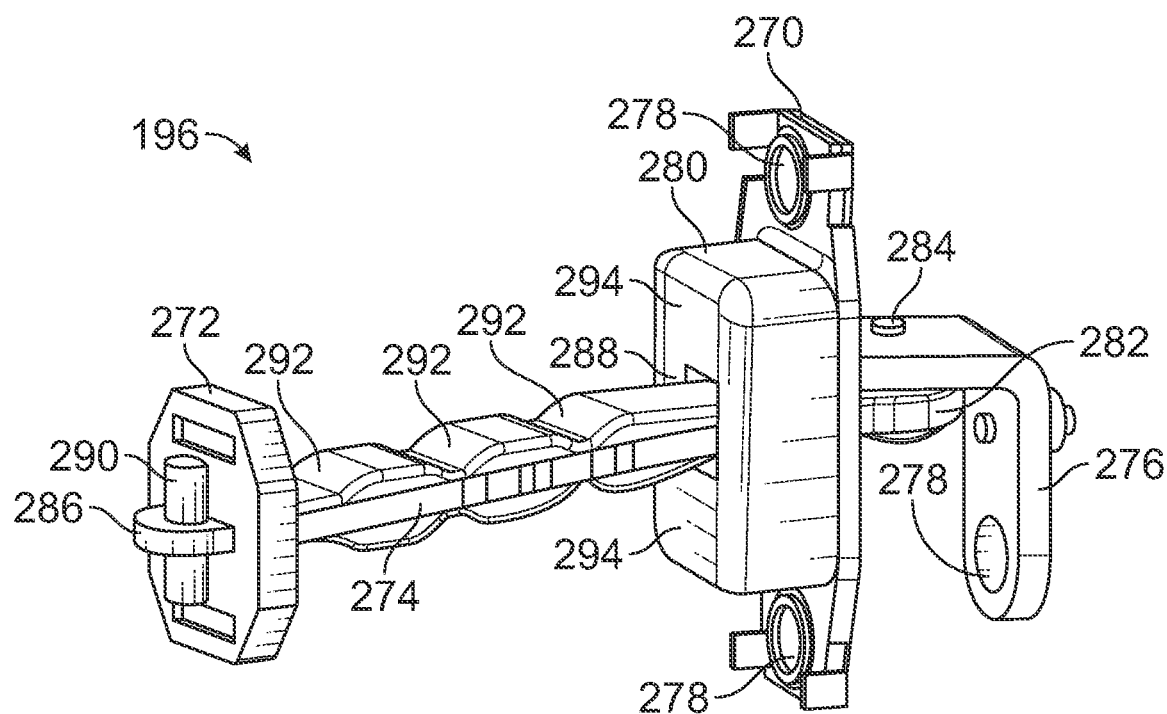
FIG. 8 is a perspective view of a door check of the door of FIG. 1.

The second member 122 includes a mounting portion 138, an upper arm 140, and a lower arm 142. A side-view mirror 264 (see FIG. 6) may be mounted to the mounting portion 138. The mounting portion 138 includes mounting holes 144 into which fasteners may be extended to secure the side-view mirror 264 to the mounting portion 138. The upper arm 140 and lower arm 142 may extend from the mounting portion 138 with a gap 141 therebetween. As described below, a door check 196 (see FIG. 8) may be mounted to the inner reinforcement 106 and positioned within the gap 141 when the inner reinforcement 106 is connected to the support 102.

The upper arm 140 includes a first portion 146 extending substantially forward from the mounting portion 138 to a second portion 148 that extends substantially vertically. The upper hinge 116 may be secured to the second portion 148 of the upper arm 140 and to the vehicle such that the support 102 is able to pivot about the hinge 116 relative to the vehicle. For example, a portion of the upper hinge 116, such as a hinge leaf 150, may be secured to the upper arm 140, e.g., with fasteners. During installation of the door 100, the hinge leaf 150 may be connected via a pin to a portion of the upper hinge 116 that is mounted to the vehicle.

The lower arm 142 includes a first portion 152 extending substantially vertically downward from the mounting portion 138, a second portion 154 extending obliquely relative to the first portion 152, and a third portion 156 extending substantially vertically from the second portion 154. The lower hinge 118 may be secured to the third portion 156 of the lower arm 142 and to the vehicle such that the support 102 is able to pivot about the hinge 118 relative to the vehicle. A portion of the lower hinge 118, such as a hinge leaf 158, may be secured to the lower arm 142, e.g., with fasteners. During installation of the door 100, the hinge leaf 158 may be connected to another portion of the lower hinge 118 that is mounted to the vehicle.

While the above embodiment describes the door 100 being attached to the vehicle by two hinges 116, 118, any number of hinges may be used. In some embodiments, the door 100 is attached to the vehicle by a single hinge, for example, hinge 116. In such embodiments, the second member 122 may include one arm, for example, the upper arm 140, to connect to the hinge 116.

With respect to FIGS. 3A-3D, the inner reinforcement 106 includes a body 170 having a shape corresponding to an opening of the cab of the vehicle. The body 170 may be formed of a plastic material such as, for example, semi-crystalline materials such as polypropylene, nylon, and/or polyesters and/or amorphous blends such as polycarbonate (PC), acrylonitrile butadiene styrene (ABS), poly(p-phenylene oxide) (PPE) and/or polystyrene (PS). The plastic material may be reinforced with glass fiber or carbon fiber. The body 170 may be formed of one or more recyclable plastics, such as a plastic comprising a high glass material composition. The body 170 may be a molded body, for example, formed by an injection molding process. The body 170 includes a channel 172 that extends generally about the periphery of the body 170. The channel 172 provides the body 170 with increased strength and rigidity. The channel 172 may include a plurality of ribs 174 extending across the interior of the channel 172 to provide increased strength to the channel 172 and the inner reinforcement 106. The shape of the channel 172 corresponds to the door frame of the vehicle. An interior surface 176 of the channel 172 may support a seal that engages the door frame of the vehicle cab. The seal may include one or more rubber seal strips that are secured to the channel 172 using, for example, adhesive and/or fasteners. When the door 100 is closed, the seal contacts the door frame of the vehicle and inhibits fluid and debris from entering or exiting the vehicle between the door 100 and the door frame.

The body 170 may include a peripheral flange 171 extending outward from the channel 172. The outer shell 108 may be attached to the inner reinforcement 106 by securing the peripheral flange 171 of the body 170 to an interior surface of the outer shell 108. For example, the flange 171 may be bonded to the outer shell 108 by welding and/or an adhesive.

The inner reinforcement 106 includes a window opening 178 formed in the upper portion of the body 170. The window opening 178 permits occupants of the vehicle to see through the window opening 178. The window 103 of the door 100 includes a movable windowpane 182 (see FIG. 1A) and a stationary windowpane 186. One or more windowpanes of the door 100 may be positioned within the window opening 178 when the window 103 of the door 100 is closed, e.g., the movable windowpane 182 is in an upper position and extends in the window opening 178.

In some embodiments, the door 100 includes a single movable windowpane 182 that is sized to cover the entire window opening 178. The inner reinforcement 106 includes a recessed portion 180 formed by walls 188, 190 on an interior side of the body 170 that receives a carrier or track 224 and the movable windowpane 182 of the window system 104. The track 224 may be positioned to extend from the recess portion 180 and upward to an upper edge 178A of the window opening 178. As explained below, the window system 104 may be operated to move the movable windowpane 182 upward into the window opening 178 to a closed position where the windowpane 182 extends to the top of the window opening 178. Conversely, the window system 104 may be operated to move the movable windowpane 182 downward into the recess portion 180 of the inner reinforcement 106 to an open position wherein an upper edge of the movable windowpane 182 is spaced from the upper edge 178A of the window opening 178. The channel 172 may extend along the lower end of the recessed portion 180. The channel 172 may include a slot 184 through which a lower end of the track 224 extends and through which the windowpane 182 may extend as the windowpane 182 is moved downward.

The inner reinforcement 106 may further include a through opening 181 formed in the body 170 at the recessed portion 180. The opening 181 may provide clearance for the support 102 and/or window system 104 during assembly of the door 100. The opening 181 reduces the amount of material used to make the inner reinforcement 106 which reduces the weight of the inner reinforcement 106. The inner reinforcement 106 may include a channel 179 formed in the body 170 about the access opening 181 to provide increased rigidity and strength to the inner reinforcement 106 about the access opening 181. The inner reinforcement 106 may include a mounting surface 200 having mounting holes 202 to which a portion of the window system 106 may be secured.

The inner reinforcement 106 may also include an opening 192 through which the side-view mirror 264 of the vehicle may be mounted to the support 102. The inner reinforcement 106 may include a recessed portion 194 formed on the outer side of the body 170 into which the door check 196 (see FIG. 8) may be mounted. The door check 196 may hold the door 100 at one or more predetermined positions as the door 100 is moved between closed and open positions about the hinges 116, 118 such that moving the door 100 from one of the predetermined positions (e.g., fully open and/or intermediate positions) requires a force threshold to be overcome.

For example, the door check 196 may hold the door 100 at the fully open position by, for example, increasing the amount of force required to move the door from the fully open position toward the closed position. The door check 196 may also hold the door 100 at one or more intermediate or partially open positions requiring increased force to move the door 100 from the intermediate position toward either the fully open or closed position. Including the door check 196 inhibits the door 100 from swinging freely about the hinges 116, 118 when the door 100 is moved between the closed and open positions. In some forms, the door check 196 may also inhibit the door 100 from slamming shut.

The door check 196 may be attached to the body 170 of the inner reinforcement 106 at the recessed portion 194. The door check 196 may be mounted to a mounting portion 198 of the body 170 of the inner reinforcement 106 (see FIG. 3C). The inner reinforcement 106 is sufficiently rigid and has sufficient strength to bear the forces applied to the inner reinforcement 106 by the door check 196. A door check 196 according to one example embodiment is provided with respect to FIG. 8. The door check 196 includes a door mounting bracket 270 for mounting to a door, a stopper 272 to limit travel of the door, an arm 274, and a body mounting bracket 276 for mounting to a body of the vehicle. The door mounting bracket 270 has mounting holes 278 for attaching the door mounting bracket 270 to the mounting portion 198 of the inner reinforcement 106. The door check 196 includes a housing 280 of the door mounting bracket 270 that includes an opening 288 for receiving the arm 274 of the door check 196. A first end portion 282 of the arm 274 is attached to the body mounting bracket 276. The first end portion 282 of the arm 274 may be hingedly coupled to the body mounting bracket 276 via a pin 284 such that the arm 274 is able to pivot relative to the body mounting bracket 276. The body mounting bracket 276 may include one or more mounting holes 278 that are used to attach the body mounting bracket 276 to the body of the vehicle, for example, the door frame. The arm 274 extends through the housing 280 to a second end portion 286 of the arm 274 which is attached to the stopper 272. The stopper 272 may be connected to the arm 274 via a pin 290 such that the stopper 272 is able to pivot relative to the arm 274.

The arm 274 may slide through the opening 288 of the housing 280 as the door 100 is moved between open and closed positions. When the door 100 is moved to the fully open position, the arm 274 may be drawn through the case 280 until the stopper 272 contacts the housing 280. The stopper 272 may be sized such that it is not able to pass through the opening 288 of the housing 280 thus inhibiting the door 100 from being able to be opened any further. The arm 274 includes one or more recesses such as detents 292 disposed along the length of the arm 274 to hold the door 100 in open positions intermediate the fully open and closed positions. The housing 280 may have protrusions 294 such as or spring-biased rollers that slide or roll along the arm 274 as the arm 274 shifts in and out of the opening 288 of the housing 280. When the protrusions 294 engage the detents 292, a greater force may be required to move the door 100 away from the door positions associated with the detents 292 due to the greater force required to move the protrusions 294 out of the detents 292 in the arm 274.

In other embodiments, the door check 196 is attached to the forward end portion 115 of the support 102 along with the hinge leaves 150, 158. When the door 100 is installed on a vehicle, the door check 196 may further be connected to the vehicle (e.g., the door frame of the vehicle).

Returning to FIGS. 1A-1C, in one embodiment the outer shell 108 is an outer covering of the door 100 that is visible from the exterior of the vehicle. The outer shell 108 may be formed of a plastic material such as a polymer including mineral filled thermoplastic polyolefins (TPO) and/or polycarbonates such as PC, ABS, acrylonitrile styrene acrylate (ASA), polyester, PPE, and/or PS as examples. The outer shell 108 may be formed using an injection molding process. The outer shell 108 may have a unitary, one-piece construction or may be made of multiple assembled components. Where the outer shell 108 is made of multiple assembled components, the components may all be made of the same material or of different materials. For instance, the outer shell 108 may include a main door body component and a window surround component. The window surround component may be formed of a different material than the material of the main door body component. The outer shell 108 may be formed to correspond to the shape of the opening of a door frame of the vehicle (e.g., a cab of a semi-truck). The outer shell 108 may be formed to aesthetically correspond to the body of the vehicle. For example, the outer shell 108 may be formed such that the door 100 matches the contours and style of the exterior of the body of the vehicle. The outer shell 108 may also be formed to be aerodynamic to reduce the drag of the door 100 during operation of the vehicle which may increase the fuel economy of the vehicle.

With reference to FIGS. 1A and 1C, the exterior surface of the outer shell 108 may be painted to match the body of the vehicle to which the door 100 is installed. In another embodiment, the material of the outer shell 108 may have a color that corresponds to the body of the vehicle. The exterior surface of the outer shell 108 may be textured, for example, texture formed in the material as part of molding the outer shell 108, to aesthetically correspond to the body of the vehicle. The periphery of the outer shell 108 may include a generally flat peripheral flange 109 that is secured to the generally flat peripheral flange 171 of the inner reinforcement, such as by an adhesive. In another embodiment, the flange 109 may have an upstanding peripheral wall that extends partially around the flange 171 when the outer shell 108 and inner reinforcement are assembled together.

With reference to FIG. 1C, the outer shell 108 may define a window opening 230 that is aligned with the window opening 178 of the inner reinforcement 106. The outer shell 108 includes an opening 216 for an exterior door handle 262. The exterior door handle 262 may be mounted within the opening 216 such that the door handle 262 is accessible to a user to open the door 100. A mechanical linkage may extend within the door 100 from the exterior door handle 262 to the latch mechanism 114. Actuation of the door handle 262 may cause the latch mechanism 114 to release the striker of the vehicle door frame and allow the door 100 to be pivoted about the hinges 116, 118 toward the open position.

In some embodiments, the outer shell 108 may include an opening 232 through which a side-view mirror 264 may extend to be mounted to the door 100, for example, to the mounting portion 138 of the support 102. In other embodiments, the outer shell 100 does not include the opening 232, for example, where the side-view mirror 264 is mounted to another portion of the vehicle (e.g., the cowl). An optical sensor such as camera 266 (see FIG. 1A) may also be mounted to the outer shell 108 to provide the driver of the vehicle with increased visibility to the side or rear of the vehicle. For example, the camera 266 may be oriented to face rearward to capture images outside of the driver's view, for example, within the driver's blind spot. The image frames captured by the camera 266 may be communicated to a computing device of the vehicle and displayed to the driver via a display screen of the vehicle. In some forms, the camera is mounted to the side-view mirror 264. The optical sensor may include a radar and/or LIDAR sensor used to detect the presence and/or distance to objects within the field of view of the optical sensor.

Forming the inner reinforcement 106 and outer shell 108 out of a plastic material has several advantages compared to using a metal material as in conventional vehicle doors. For instance, using plastic for the inner reinforcement and outer shell 108 reduces the overall weight of the door 102 compared to conventional doors made of stamped and joined sheet metal. Reducing the weight of the door reduces the weight of the vehicle which may improve the fuel economy of the vehicle. Additionally, forming the inner reinforcement 106 and outer shell 108 from plastics reduces the complexity of the door 100 and aids in reducing the manufacturing and assembly time of the door 100 compared to some conventional doors. Plastics are also non-conductors and thus permit electromagnetic signals to pass through the door 100 with less interference. As a result, the signal range of communication devices of the vehicle may be improved. Moreover, many plastic materials are readily recyclable. Thus by forming the inner reinforcement 106 and/or outer shell 108 of the door 100 from a recyclable plastic, at least these portions of the door 100 may be recycled, for example, at the end of the lifetime of the vehicle and/or if the door 100 becomes damaged.

Figure 4A:
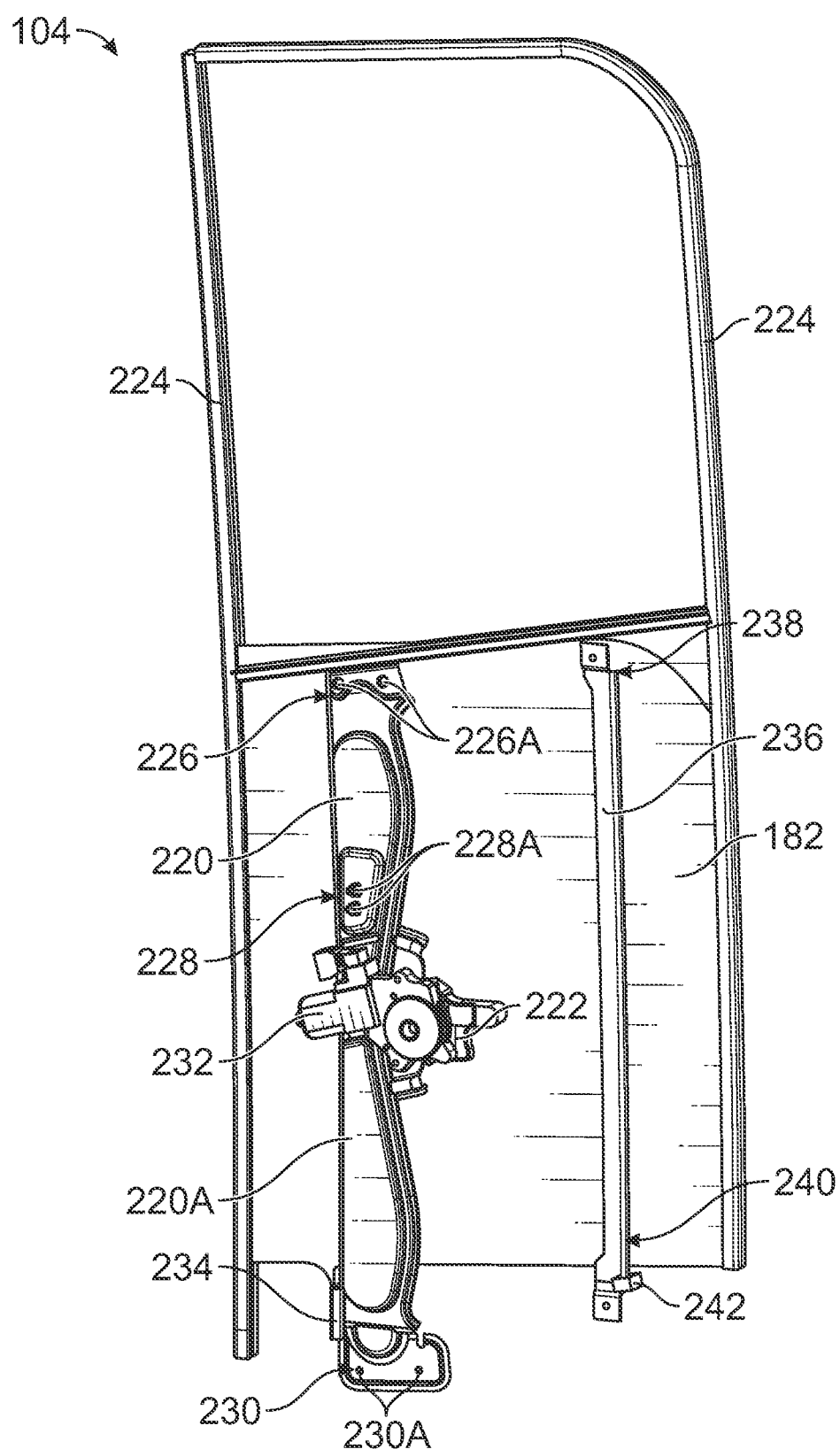
FIGS. 4A and 4B are interior perspective and exterior perspective views, respectively, of a window system of the door of FIG. 1A.
Figure 4B:
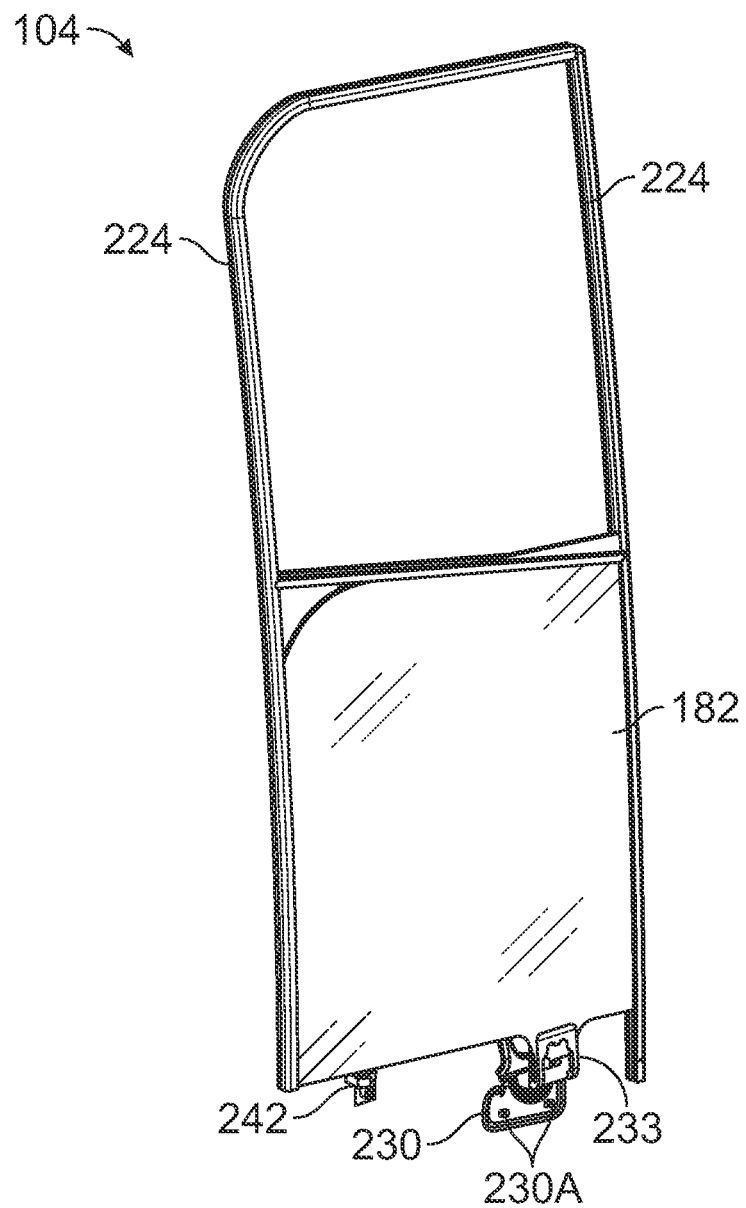

With respect to FIGS. 4A-5, the window system 104 includes a mounting bracket 220, a window regulator 222, the movable windowpane 182, and the window carrier, such as guide track 224. The mounting bracket 220 includes an upper mounting portion 226, an intermediate mounting portion 228, and a lower mounting portion 230. The upper mounting portion 226 includes mounting holes 226A corresponding to the mounting holes 136 (see FIG. 2A) of the upper crossbar portion 126 which may be used to secure the upper mounting portion 226 to the upper crossbar portion 126 of the support 102. The intermediate mounting portion 228 includes mounting holes 228A corresponding to the mounting holes 137 of the lower crossbar portion 128 which may be used to secure the intermediate mounting portion 228 to the lower crossbar portion 128 of the support 102. The lower mounting portion 230 includes mounting holes 230A corresponding to the mounting holes 202 of the inner reinforcement 106 which may be used to secure the lower mounting portion 230 to the inner reinforcement 106. The guide track 224 may be positioned adjacent an interior side 106A (see FIG. 1C) of the inner reinforcement 106 to guide the movable windowpane 182 between open and closed positions within the window opening 178. The guide track 224 may include a groove for receiving an edge of the windowpane 182 to guide the windowpane 182 as it is moved up and down within the guide track 224 and to inhibit the windowpane 182 from tilting relative to the track 224.

The window regulator 222 is mounted to the mounting bracket 220. The window regulator 222 includes an electric motor 232 that moves the movable windowpane 182 along the track 224. The window system 104 may include a trolley 234 secured to the windowpane 182 that the motor 232 drives upward and downward to raise and lower the windowpane 182. The trolley 234 may include a U-shaped member, such as clip 233, that receives and supports a lower portion of the windowpane 182. The trolley 234 may be attached to the mounting bracket 220 and configured to move upward and downward along the mounting bracket 220. For example, the trolley 234 may include a recess that recess that receives a straight edge 220A of the mounting bracket 220. The straight edge 220A may serve as a track guiding the trolley 234 as the trolley 234 is moved upward and downward by the motor 232. The window regulator 222 may be controlled by a switch, such as a rocker switch, mounted to the inner cover panel 110 of the door 100 and/or within the vehicle. A user may operate the switch to cause the window regulator 222 to move the movable windowpane 182 upward and/or downward along the track 224.

The window system 104 may further include a second mounting bracket 236 to support the movable windowpane 182. The mounting bracket 236 has a first end portion 238 the connects to the upper crossbar portion 126 of the support 102 and a second end portion 240 that connects to a lower portion of the inner reinforcement 106. The mounting bracket 236 includes a stop 242 at the second end 240 that supports the movable windowpane 182 when the windowpane 182 is lowered to the fully open position. The stop 242 may have a recess, such as a groove, for receiving a bottom edge of the windowpane 182 when the windowpane 182 is in the fully open position. The stop 242 may serve as a hard stop to prevent the windowpane 182 from being lowered beyond a predetermined vertical position along the mounting bracket 236.

Returning to FIGS. 1A-C, the door 100 includes the inner cover panel 110. The inner cover panel 110 includes a main body 250 that mounts to the inner reinforcement 106 and conceals the support 102 and portions of the window system 104. The main body 250 may be formed of a plastic material such as a polymer including mineral filled TPO, PC, ABS, ASA, polyester, PPE, and/or PS as examples. The main body 250 may be formed as a single-piece, for example, by injection molding. In another approach, the inner cover panel 110 may be formed by over molding or insert molding the plastic over stiff woven sheets, for example, glass reinforced compression molded sheets. The main body 250 includes outwardly extending protrusions 252, 254 that extend outward about the inner reinforcement 106 to cover portion of the door 100 that faces the doorjamb. The main body 250 may be removably attached to the inner reinforcement 106 and/or the support 102 by door panel retainer clips to allow the inner cover panel 110 to be easily removed for servicing the door 100. The inner cover panel 110 may include a kick panel 256 removably attached to the main body 250 by fasteners. The kick panel 256 provides a surface against which an occupant of the vehicle may press with their leg or foot to aid in pivoting the door toward the open position. The kick panel 256 may be formed of a scuff resistant material (e.g., a plastic or metal) such that surface of the kick panel 256 is not scuffed or damaged over time as the occupant uses the kick panel 256 to open the door 100. The inner cover panel 110 may include a handle 258 of the main body 250 that a user may grasp to move the door 100, for example, to pull the door closed. The inner cover panel 110 may further include an opening to which an interior door handle 260 is mounted. The interior door handle 260 may include a lever movable by a user to user to disengage the latch mechanism 114 to open the door 100. The lever of the interior door handle 260 may be connected by a mechanical linkage to the latch mechanism 114 such that when the user pulls on the lever the mechanical linkage causes the latch mechanism 114 to disengage and release the striker of the vehicle.

Figure 7:
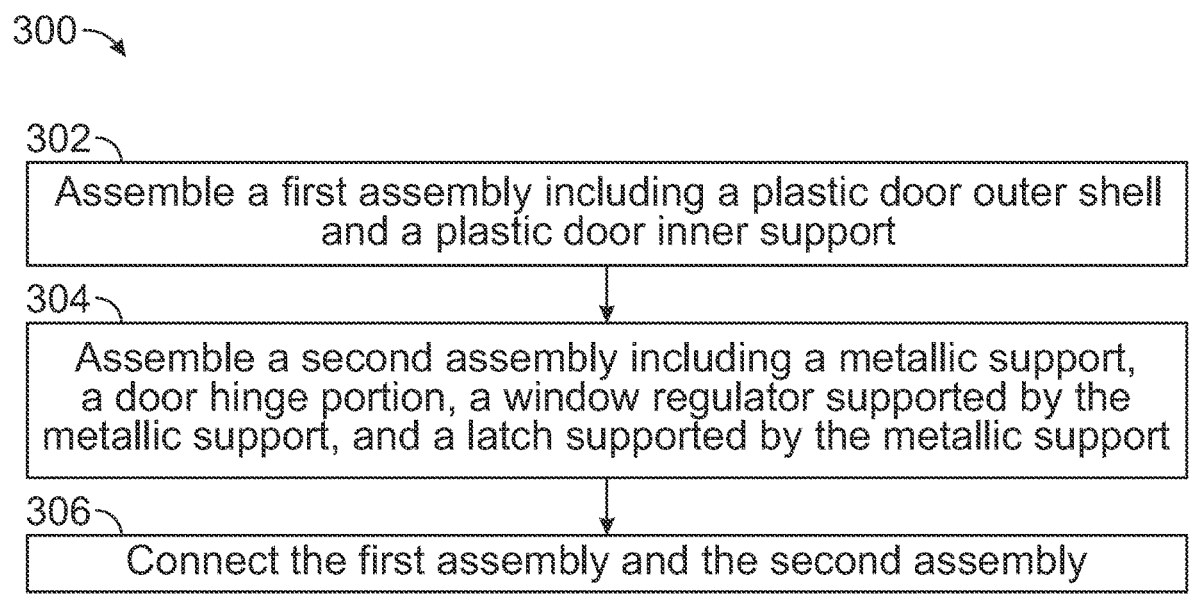
FIG. 7 is a flow chart of a method of assembling the door of FIG. 1.

With respect to FIG. 7, the door 100 may be assembled according to method 300. The outer shell 108 may be assembled 302 with the inner reinforcement 106 to form a first assembly. Assembling 302 the first assembly may include attaching the outer shell 108 to the inner reinforcement 106. The outer shell 108 may be attached to the inner reinforcement 106 by bonding the outer shell 108 to the inner reinforcement 106. For example, the outer shell 108 may be bonded by chemical bonding, an adhesive (e.g., an adhesive or tape), and/or or a weld (e.g., laser weld, plastic weld, induction weld). For example, the flange 109 and/or the periphery of the outer shell 108 may be attached to the flange 171 of the inner reinforcement 106. The outer shell 108 may be welded to the flange 171 of the inner reinforcement 106 at various points or continuously about the periphery of the outer shell 108. Bonding the outer shell 108 to the inner reinforcement 106 may create a seal therebetween which may inhibit fluid and debris from entering the door 100.

The method 300 further includes assembling 304 a second assembly including the rigid support 102, hinge leaves 150, 158, and portions of the window system 104. The upper hinge leaf 150 may be attached to the upper arm 140 of the second member 122, for example, with fasteners. The lower hinge leaf 158 may be attached to the lower arm 142 of the second member 122, for example, with fasteners. The latch mechanism 114 may be connected to the connecting portion 130 of the first member 120. The upper mounting portion 226 and intermediate mounting portion 228 of the mounting bracket 220 of the window system 104 may be attached to the upper crossbar portion 126 and the lower crossbar portion 128 of the first member 120, respectively. For example, the upper and intermediate mounting portions 226, 228 may be attached to the first member 120 by welding or with fasteners. The upper end portion 238 of the second mounting bracket 236 may also be attached to the support 102, for example, by one or more fasteners. The window regulator 222 may be attached to the mounting bracket 220 by fasteners. The track 224 and movable windowpane 182 of the window system 104 may also be included in the second assembly. A lower portion of the track 224 may extend through the slot 184 in the inner reinforcement 106. The track 224 may extend along and be supported by surfaces on the interior side of the recessed portion 180 of the inner reinforcement 106 (see FIG. 5). An upper portion of the track 224 may extend along and be attached to the channel 172 of the inner reinforcement 106. The support 102 may include recesses or notches 131, 133 formed in the exterior side of the crossbar portions 126, 128 for receiving and supporting the track 224 (see FIG. 2A). The track 224 may be attached to the support 102 and inner reinforcement 106, for example, by fasteners, snap joints, and/or and adhesive.

Tracks can be attached by fasteners, adhesives, or snap joints. The assembling 304 may include mounting the windowpane 182 within the track 224 and positioning the lower edge of the windowpane 182 on the stop 242 of the second mounting bracket 236 and the clip 233 of the trolley 234.

The method 300 includes connecting 306 the first assembly and second assemblies. The lower portion of the track 224, windowpane 182, and mounting brackets 220, 236 may be positioned within the recessed portion 180 of the interior side of the inner reinforcement 106 and extended through the slot 184. The support brackets 220, 236 may be connected to the inner reinforcement 106. For example, fasteners may be extended through the mounting holes 230A of the lower mounting portion 230 of the mounting bracket 220 and into the mounting holes 202 of the mounting surface 200 of the inner reinforcement 106. Fasteners may be extended through mounting hole(s) of the lower end portion 240 of the second mounting bracket 236 and into a corresponding mounting hole of the inner reinforcement 106. In one approach, an assembler may reach through the opening 181 to align the mounting brackets 220, 236 and/or to install the fasteners to attach the mounting brackets 220, 236 to the inner reinforcement 106.

The exterior door handle 262 may be mounted at the opening 216 in the outer shell 108. The method 300 may include connecting the linkage of the exterior door handle 262 to the latch mechanism 114 by accessing the exterior door handle 262 via the access opening 181. The interior door handle 260 may be mounted to the inner cover panel 110 and connected to the latch mechanism 114. The inner cover panel 110 may be removably attached to the interior surface of the inner reinforcement 106 and/or the rigid support 102, for example, using door panel retainer clips. Where the door 100 includes a side-view mirror 264, the method 300 may include advancing a portion of the side-view mirror 264 through the openings 232, 192 in the outer shell 108 and inner reinforcement 106 to mount the side-view mirror to the mounting portion 138 of the support 102.

Figure 9A:
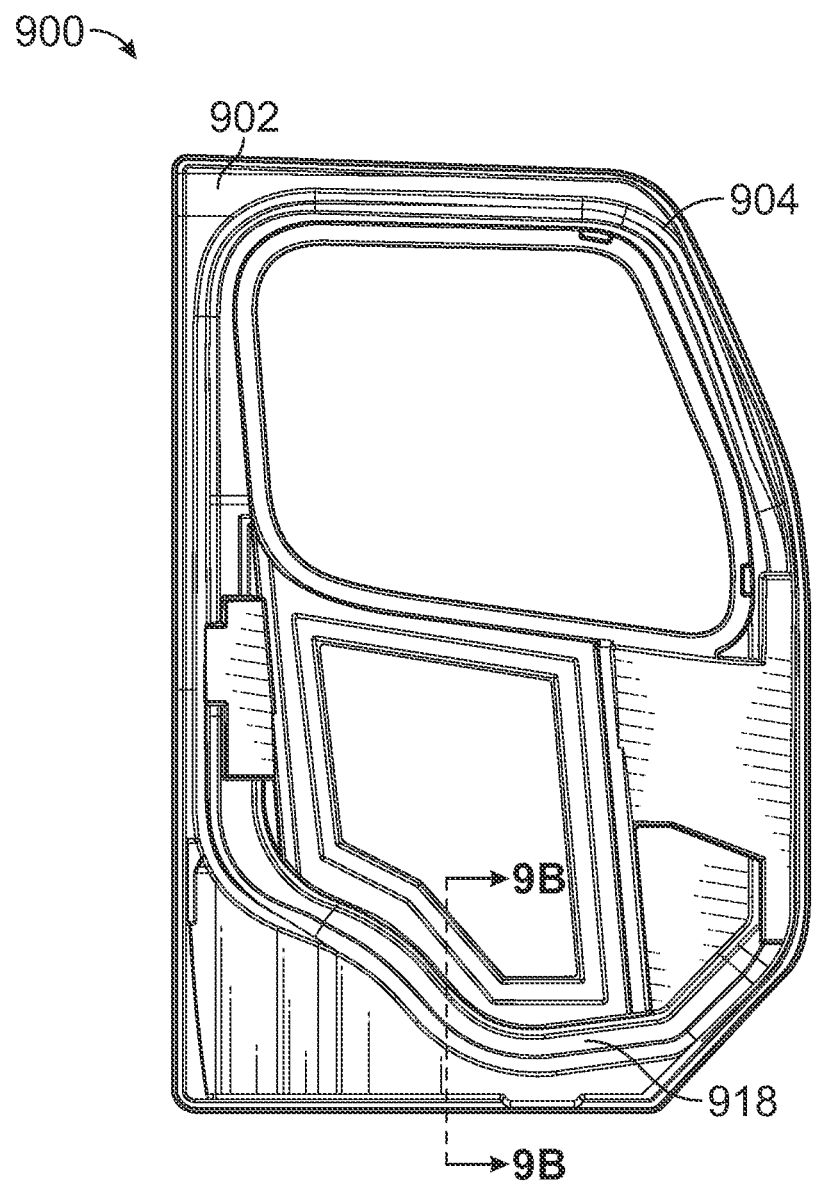
FIG. 9A is an elevational view of an exterior side of a reinforcement according to another embodiment.
Figure 9B:
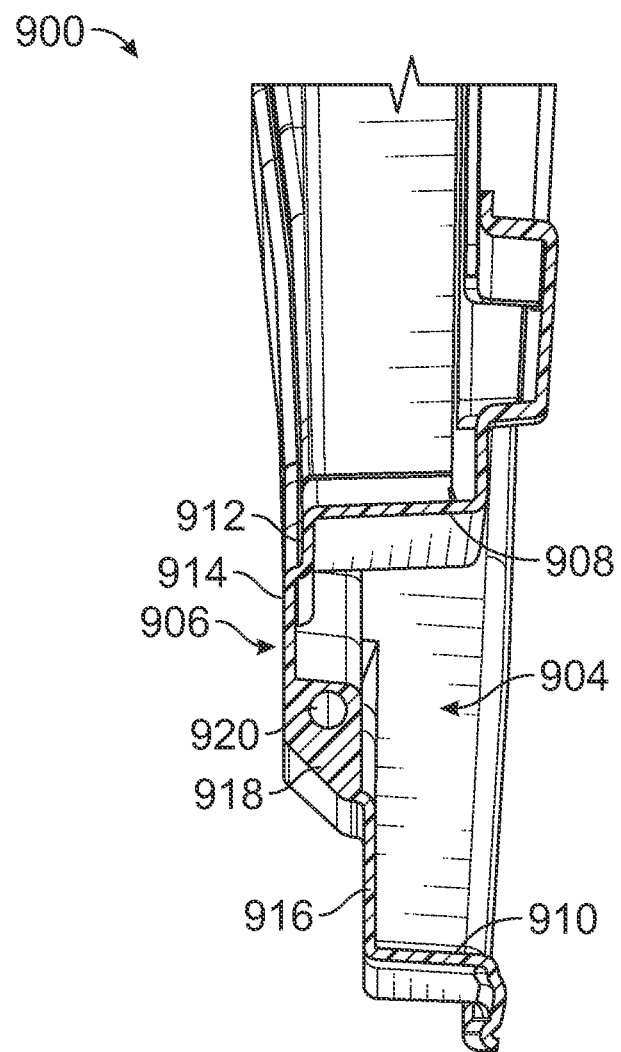
FIG. 9B is a cross-sectional view of a portion of the reinforcement of FIG. 9A taken along line 9B-9B in FIG. 9A.

With respect to FIG. 9A-9B, another inner reinforcement 900 that may be used in door 100 is provided according to another embodiment. The inner reinforcement 900 is similar in many respects to the inner reinforcement 106 of FIGS. 3A-3D such that the differences will be highlighted. The inner reinforcement 900 includes a body 902 having a shape corresponding to an opening of the cab of the vehicle. The body 902 may be formed of a plastic material, such as the materials discussed above. The body 902 may be a molded body, for example, formed by an injection molding process. The body 902 includes a channel 904 that extends generally about the periphery of the body 902. The channel 904 provides the body 902 with increased strength and rigidity.

With respect to FIG. 9B, the channel 904 includes a channel base 906 and sidewalls 908, 910 upstanding from the channel base 906. The channel base 906 includes a first base wall 912 extending from sidewall 908 to an intermediate wall 914. The intermediate wall 914 is connected to a second base wall 916 by a backbone or reinforcing portion 918. The second base wall 916 extends to sidewall 910. The reinforcing portion 918 extends along at least a portion of the length of the channel 904 to provide the channel 904 with increased strength and rigidity, for example, to inhibit the inner reinforcement 900 from bending and/or twisting. The reinforcing portion 918 may provide the inner reinforcement 900 with increased stiffness while allowing the inner reinforcement 900 to have a flatter profile. The reinforcing portion 918 may include an opening 920 that extends along the length of the reinforcing portion 918. The opening 920 may be formed using a gas or water assist molding technique, for example, by using a gas or water assist projectile provided in the tool used for injection molding of the inner reinforcement 900. Forming the opening 920 in the reinforcement 918 may reduce the amount of material used to make the inner reinforcement 900 which may reduce the weight and/or cost of the inner reinforcement 900.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. A vehicle door comprising:
    a plastic inner reinforcement for closing an opening of a vehicle, the plastic inner reinforcement having an upper portion for closing an upper portion of the opening and a lower portion for closing a lower portion of the opening;
    a plastic outer shell;
    an inner cover panel;
    a metallic support above the lower portion of the plastic inner reinforcement and below the upper portion of the plastic reinforcement to strengthen the vehicle door at a vertically intermediate area of the vehicle opening;
    the plastic inner reinforcement is horizontally intermediate the plastic outer shell and the metallic support;
    a hinge portion configured to connect to a corresponding hinge portion of the opening of the vehicle;
    a door latch for engaging a door strike of the opening of the vehicle;
    the support connecting the hinge portion and the door latch to inhibit movement of the door latch relative to the hinge portion;
    wherein the hinge portion and the door latch are mounted to the support and are carried thereon, the support connecting the hinge portion and the door latch to the plastic inner reinforcement;
    a windowpane;
    a windowpane regulator operable to move the windowpane between an open position and a closed position; and
    the windowpane is outward of the metallic support and inward of the plastic inner reinforcement with the windowpane in the open position.

2. The vehicle door of claim 1 wherein the plastic inner reinforcement has a unitary, one-piece construction.

3. The vehicle door of claim 1 wherein the plastic inner reinforcement extends around the entire opening of the vehicle.

4. The vehicle door of claim 1 wherein the plastic inner reinforcement includes a window opening and a strengthening channel extending about the window opening.

5. The vehicle door of claim 1 wherein the plastic inner reinforcement includes a recess, the vehicle door further comprising the windowpane regulator in the recess of the plastic inner reinforcement.

6. The vehicle door of claim 1 wherein the metallic support comprises a plurality of metallic support members joined together with at least one of welds, fasteners, and adhesive.

7. The vehicle door of claim 1 wherein the plastic inner reinforcement and the metallic support are between the plastic outer shell and the inner cover panel.

8. The vehicle door of claim 7 wherein the metallic support is between the inner cover panel and the plastic inner reinforcement.

9. The vehicle door of claim 1 wherein the hinge portion comprises:
    a lower hinge portion configured to connect to a corresponding lower hinge portion of the opening of the vehicle; and
    an upper hinge portion configured to connect to a corresponding upper hinge portion of the opening of the vehicle.

10. The vehicle door of claim 1 wherein the plastic inner reinforcement has an opening sized to receive the windowpane with the windowpane in the open position.

11. The vehicle door of claim 1 further comprising a windowpane track.

12. The vehicle door of claim 11 wherein the windowpane regulator is mounted to the metallic support.

13. The vehicle door of claim 1 wherein the plastic inner reinforcement includes an elongate reinforcing portion and an enclosed opening extending along the elongate reinforcing portion.

14. The vehicle door of claim 1 further comprising a door check configured to keep the vehicle door at one or more predetermined positions as the vehicle door is moved between open and closed positions.

15. A method of assembling vehicle door of claim 1, the method comprising:
    mounting the hinge portion and the door latch to the metallic support so that the metallic support connects the hinge portion and the door latch to inhibit movement of the door latch relative to the hinge portion; and
    assembling the plastic inner reinforcement, the plastic outer shell, the inner cover panel, and the metallic support.

16. The method of claim 15 wherein assembling the plastic inner reinforcement, the plastic outer shell, the inner cover panel, and the metallic support includes positioning at least a portion of the metallic support in an opening of the plastic inner reinforcement.

17. The method of claim 15 further comprising mounting the windowpane regulator to the metallic support.

18. The method of claim 15 further comprising assembling the metallic support including assembling support members.

19. The method of claim 15
    wherein assembling the plastic inner reinforcement, the plastic outer shell, the inner cover panel, and the metallic support includes positioning the windowpane between the plastic inner reinforcement and the metallic support.

20. The method of claim 15 wherein mounting the hinge portion to the metallic support comprises mounting two hinge portions to the metallic support.

21. The vehicle door of claim 1 wherein the door latch comprises:
    a body mounted to the support; and
    a latch movable relative to the body to engage the door strike of the opening of the vehicle.

22. The method of claim 15 wherein assembling the plastic inner reinforcement, the plastic outer shell, the inner cover panel, and the metallic support comprises:
    positioning the plastic outer shell outward of the plastic inner reinforcement;
    positioning the plastic inner reinforcement outward of the metallic support; and positioning the inner cover panel inward of the metallic support.

23. The vehicle door of claim 1 wherein the plastic inner reinforcement includes a window opening to be closed by the window in the closed position thereof; and wherein the metallic support includes a rear view mirror mounting portion below the window opening of the plastic inner reinforcement.

\* \* \* \* \*